[54] METHOD FOR CODING ADDRESSES OF INFORMATION CHANGE PICTURE ELEMENTS IN FACSIMILE SIGNAL

[75] Inventors: Yukio Nakagome, Yokohama; Hiroichi Teramura, Tokyo; Yasuhiro Yamazaki, Hiratsuka; Yasushi Wakahara, Tokyo, all of Japan

[73] Assignee: Kokusai Denshin Denwa Kabushiki Kaisha, Japan

[21] Appl. No.: 740,716

[22] Filed: Nov. 10, 1976

[30] Foreign Application Priority Data

Nov. 10, 1975 [JP] Japan ............................. 50-134978

[51] Int. Cl.$^2$ ..................... H04N 1/40; H04N 7/12
[52] U.S. Cl. ................................................. 358/261
[58] Field of Search ..................... 358/260, 261, 263

[56] References Cited

U.S. PATENT DOCUMENTS

| | | | |
|---|---|---|---|
| 3,801,737 | 4/1974 | Komura et al. | 358/260 |
| 3,916,095 | 10/1975 | Weber et al. | 358/261 |
| 3,927,251 | 12/1975 | White et al. | 358/261 |
| 3,991,267 | 11/1976 | Beaudette | 358/261 |
| 4,040,093 | 8/1977 | Nakagome et al. | 358/261 |
| 4,117,517 | 9/1978 | Shintani et al. | 358/261 |

Primary Examiner—John C. Martin
Assistant Examiner—Edward L. Coles
Attorney, Agent, or Firm—Robert E. Burns; Emmanuel J. Lobato; Bruce L. Adams

[57] ABSTRACT

A method for coding addresses of information change picture elements each having information different from that of the immediately preceding picture element in a facsimile signal obtained by successively scanning an original picture, in which the information change picture elements are classified into deviation change points each having a high correlation to a final reference change point selected from coded information change picture elements, and new change points each having substantially no correlation to the final reference change point. The deviation change points are coded to indicate the direction and length of each deviation thereof from the corresponding final reference change point. The new change points are coded to indicate each distance thereto from the immediately preceding information change picture element.

2 Claims, 5 Drawing Figures

METHOD FOR CODING ADDRESSES OF INFORMATION CHANGE PICTURE ELEMENTS IN FACSIMILE SIGNAL

This invention relates to a coding method which is employed for efficient coding of facsimile signals having a high two-dimensional correlation to shorten the transmission time.

As facsimile signal coding methods of the type, there have heretofore been proposed (1) a run-length coding method in which signals of one scanning line obtained by scanning are converted to a time serial configuration and then the magnitudes of the run lengths of white and black are successively coded for transmission; and (2) a plane coding method in which signals of a plurality of scanning lines are subjected to batch processing and then coded for transmission. However, the coding method (1) does not utilize the property of picture signals that they have a high correlation in a vertical direction, and hence is not sufficient in the compression effect. The method (2) is excellent in the compression effect, as compared with the method (1), but has such a defect that a memory used becomes generally large and complicated in construction.

An object of the present invention is to provide a method for coding addresses of information change picture elements in facsimile signal greatly eliminable of redundancy of facsimile signals with a memory of relatively small capacity and a simple equipment to thereby permit a remarked reduction of a required transmission time with respect to the band-time integral.

The principle of this invention is as follows:
Information change picture elements having information different from that of immediately preceding picture elements on each scanning line of facsimile signals (which information change picture elements will hereinafter be referred to as change points for the sake of brevity) are classified into deviation change points, each having a high correlation to a final reference change point selected from coded change points, and the other change points i.e. new change points having substantially no correlation to the change points already coded. The deviation points are coded to indicate the final reference change points thereof and the direction and length of each deviation from the corresponding final reference change point, and the other change points, i.e. the new change points are coded to indicate each distance thereto from the immediately preceding change point.

The principle and operation of this invention will be clearly understood from the following detailed description taken in conjunction with the accompanying drawings, in which.

Figure 1:
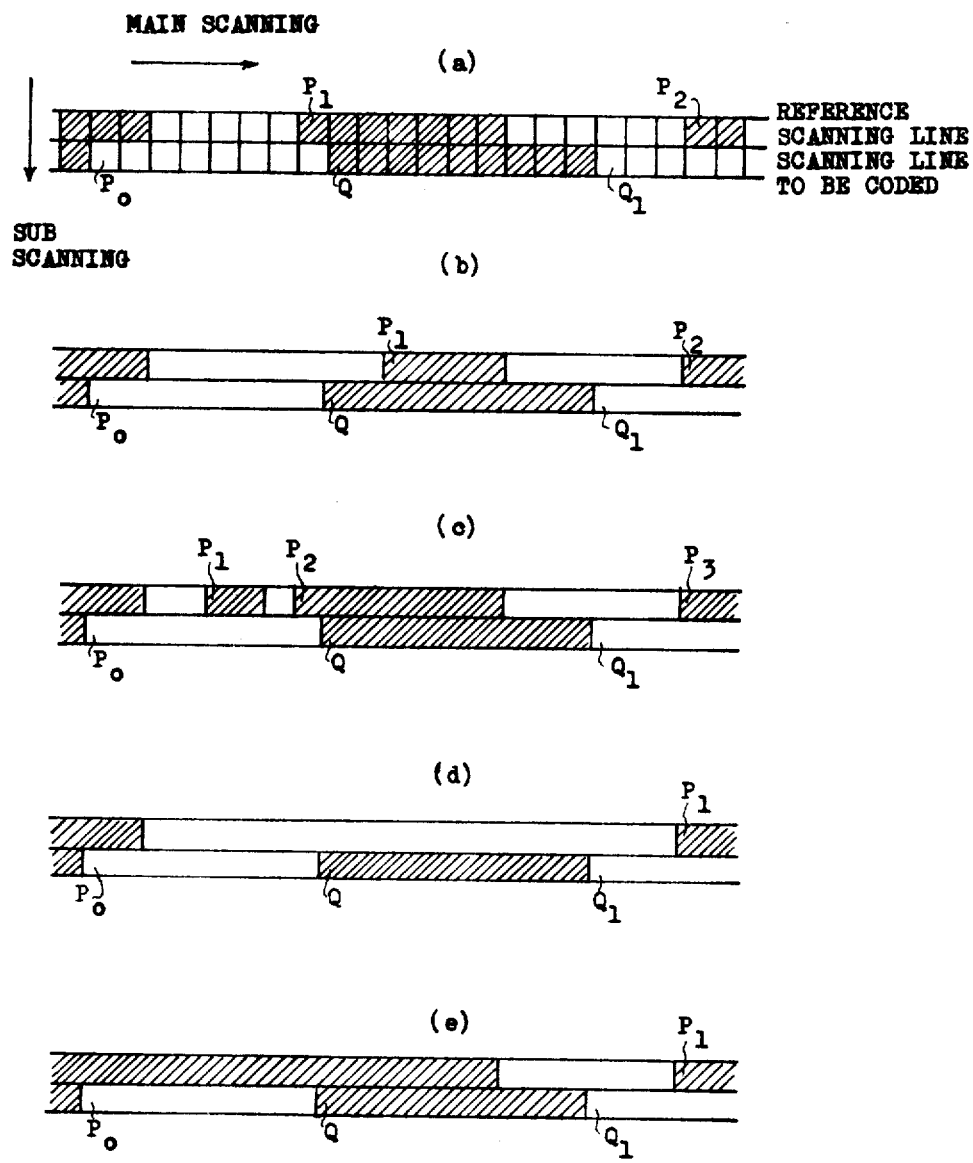
FIG. 1 shows picture element pattern diagrams explanatory of the principle and operation of this invention.

In FIG. 1 showing scanning line pattern diagrams explanatory of an example of coding according to the present invention, hatched small sections indicates black picture elements and non-hatched small sections white picture elements. Reference characters Q, $P_1$, $P_2$, etc. in FIG. 1 indicate the change points. Now, let it be assumed that the picture elements to $P_0$ have already been coded, and that the address of the change point Q is now to be coded. At first, the deviation change point will be defined. In FIG. 1, the change points $P_0$, $P_1$, $P_2$, . . . are defined with respect to the change point Q to be coded, as follows:

$P_0$: This is the change point immediately before the change point Q to be coded. In the absence of such a change point, a first picture element of the scanning line is used as a substitute therefor.

$P_1$: This is the first change point which is located further to the right than the change point $P_0$ on a scanning line (hereinafter referred to as the reference scanning line) immediately preceding the instant scanning line (the instant scanning line to be coded) including the change points Q and $P_0$ and has an information change of the same direction as the change point Q.

$P_2$: This is the change point which has an information change of the same direction as the change point Q and is the next to the change point $P_1$.

$P_3$: This is the change point which has an information change of the same direction as the change point Q and is the next to the change point $P_2$.

The subsequent ones are similar to the above. In a case where there is not such a condition: $P_i (i \leq 1)$, however, a picture element immediately succeeding the last one of the scanning line is regarded as $P_i$.

In this manner, the change points $P_0$, $P_1$, $P_2$, . . . for the reference use are defined with respect to the instant change point Q to be coded, and these change points will hereinafter be referred to as the reference change points. Next, the change points to be coded are divided into deviation change points and the other change points, i.e. new change points. The deviation change point is defined in the following, in which a series of picture elements of the same information is referred to as the run. Namely, that is herein defined as the deviation change point to be coded is such a change point to be coded that a run having the same information as on the instant run starting from the instant change point is included in the immediately preceding scanning line overlying the instant run but does not overlie on a run of the same information immediately preceding the instant run including the instant change point to be coded. For instance, in the examples shown in FIG. 1, the change points Q in cases (a) to (c) are deviation change points, but the change point Q in a case (d) is not a deviation change point because the immediately preceding scanning line does not include any run of the same information overlying on the instant run including the instant change point Q. As for the change point Q in a case (e), a run of the same information, which overlies on the instant run including the instant change point Q, exists in the immediately preceding scanning line, but this overlying run of the same information also overlies on a run of the same information immediately preceding the instant run including the instant change point Q, so that this change point Q is not the deviation change point.

The change points Q in cases (a), (b) and (c) in FIG. 1 are all the deviation change points, but the conditions in the cases (a) and (b) are different from that in the case (c). Namely, in the cases (a) and (b), a run including the change point $P_1$ overlies on the instant run including the instant change point Q, but in the case (c), a run including the change point $P_2$ overlies on the instant run including the instant point Q. A run which overlies the instant run including the instant change point Q is not always limited specifically to a run including the change point $P_1$, but may be a run including the change point $P_2$, the run including the change point $P_3$, ... in some cases.

As for the deviation change point, in order to code its address information, which change point is the final reference change point and the distance (the number of picture elements) between the final reference change point and the deviation change point are coded in practice. In the examples of cases (a) to (c) in FIG. 1, they are coded as follows:

(a) 1, +1
(b) 1, −2
(c) 2, +1

In these cases, numerals 1 and 2 represent that the reference change points are $P_1$ and $P_2$ respectively, and the numerals added with + or − indicate the distances. In this case, however, the sign + indicates that the change point Q is located further to the right than the final reference change point or at the same position as the latter, and the sign − indicates that the change point Q is positioned further to the left than the final reference change point. As for a change point which is not the deviation change point, the reference change point therefore is fixed to the point $P_0$, and the address information of the change point Q is coded by using the distance (the number of picture elements) between the change point $P_0$ and the change point Q. This is the same as the ordinary run-length coding method.

Next, a description will be given of an algorithm for the determination of the reference change point for the deviation change point defined in the above. That is, the algorithm herein mentioned is (1) for detecting that the change point Q is the deviation change point and (2) for determining the final reference change thereof if it is detected as the deviation change point.

(i) On the instant scanning line to be coded, a change point $Q_1$ next to the instant change point Q to be coded is searched. In the coding of the change point Q, the change points $P_0$, Q and $Q_1$ are used as reference information on the instant scanning line to be coded.

(ii) The information of the picture element just above the instant change point Q to be coded is checked as to whether or not it is the same as the information of the instant change point Q, and if it is different from the latter, the operation skips to the step (vii).

(iii) The picture elements on the reference scanning line are checked to the left direction (in a direction opposite to the scanning direction, starting from a picture element just above the instant change point Q and ending at a picture element just above the change point $P_0$, to look for a change point.

(iv) If no change point is found out, the instant change point Q is not the deviation change point.

(v) If the change point is found out, the instant change point Q is the deviation change point, and this found-out change point is used as the final reference change point.

(vi) The reference scanning line is checked further to the left than the final reference change point to a picture element just above the change point $P_0$ to count the number of change points of the same change direction as the instant change point Q. If this count value is taken as i, the reference change point is $P_i$.

(vii) The picture elements on the reference scanning line are checked to the right from a picture element just above the change point Q to a picture element just above the change point $Q_1$ to look for a change point.

(viii) If no change point is found out, the instant change point Q is not the deviation change point.

(ix) If the change point is found out, the instant change point Q is the deviation change point, and this found-out change point is used as the final reference point.

(x) The operation skips to the step (vi).

Figure 2:
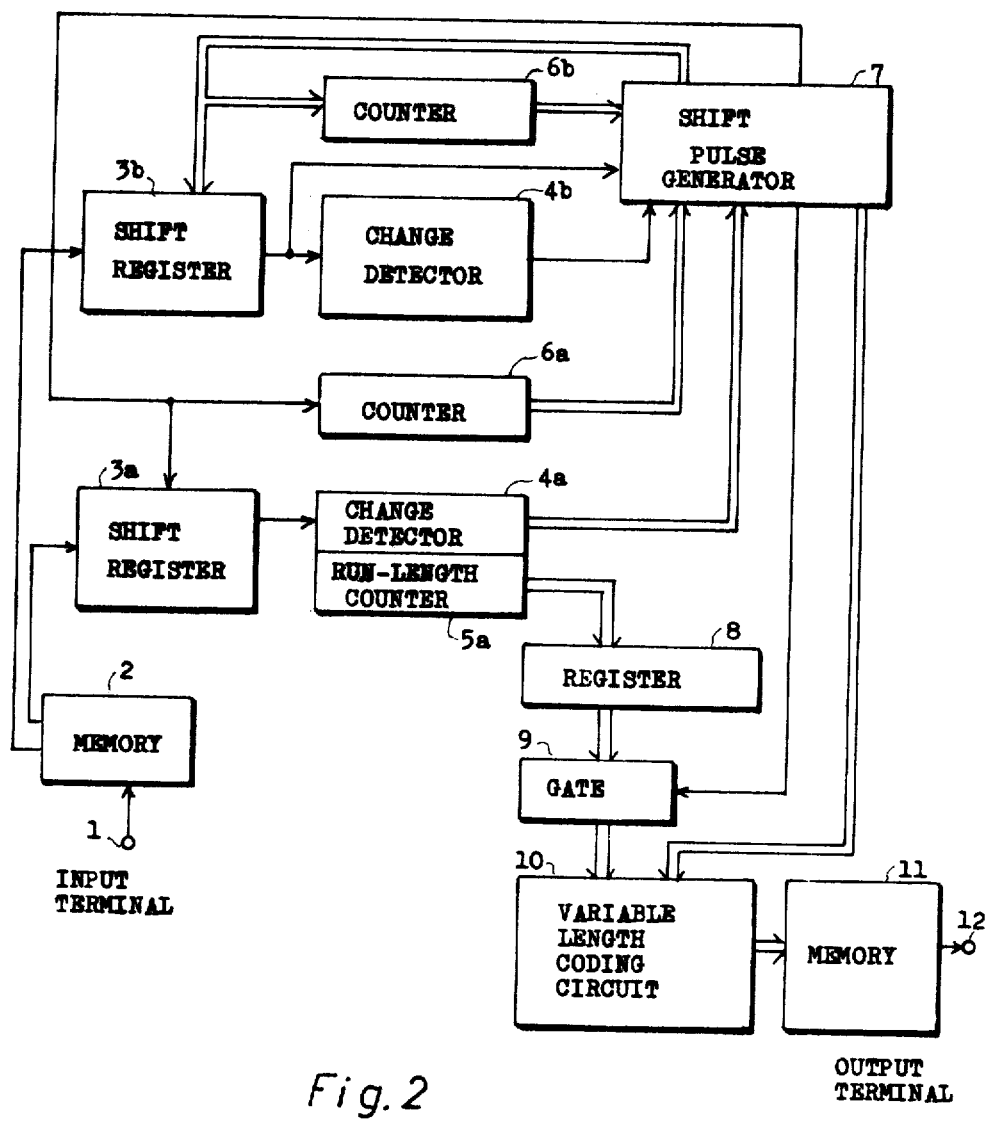
FIG. 2 is a block diagram illustrating an embodiment of this invention.

FIG. 2 is a block diagram illustrating an embodiment of this invention. In FIG. 2, reference numeral 1 indicates an input terminal for receiving a read-out facsimile signal; 2 designates a memory for temporarily storing the received facsimile signal; 3a and 3b (the suffix a corresponding to the scanning line to be coded and the suffix b the reference scanning line) identify shift registers (3b being a two-way shift register) for storing information of one scanning line; 4a and 4b denote change detectors which receives element by element (bit by bit) the picture element information stored in the shift registers 3a and 3b to detect whether or not the picture element information is different from the immediately preceding one; and 5a represents a run-length counter which counts the number of picture elements (the run length) from the detection of a change point by the change detector 4a to the detection of a next change point. Reference numerals 6a and 6b show counters which indicate how many times the shift registers 3a and 3b have been shifted, in other words, the order number, from the left ends of the respective scanning lines, of the picture elements lying at the outputs of the shift registers 3a and 3b respectively (the picture elements indicated by the counters being called absolute address), the counter 6b being a reversible counter. Reference numeral 7 refers to a shift pulse generator for generating shift pulses for the shift registers 3a and 3b; 8 indicates a register for temporarily storing the run-length information obtained by the run-length counter 5a; 9 designates a gate; 10 identifies a known variable-length coding circuit for performing such variable-length coding as shown in Table 1; 11 denotes a memory for temporarily storing coded information to deliver out the facsimile signal at a constant speed; and 12 represents an output terminal. An example of the variable length coding circuit is disclosed in our U.S. Pat. No. 4,040,093 at FIG. 8 thereof.

Table 1

| | |
|---|---|
| A. Distinction between the deviation change point and the others) | |
| Classification | Code |
| In the case of the deviation change point | 1 |
| In the case of the change point which is not the deviation change point | 0 |

| B. (Address of final reference change point, length of deviation and run length) | |
|---|---|
| Classification | Code |
| 1 | 0 |
| 2 | 1 0 |
| 3 | 1 1 0 |
| ⋮ | ⋮ |
| | (n-1) |

Table 1-continued

| $\overline{1}$<br>n | $\overline{1\ 1\ \ldots\ 1}\ 0$ |
|---|---|
| C. (Direction of deviation) | |
| Classification | Code |
| Right side (including the same position) (+) | 1 |
| Left side (−) | 0 |

The operation of the circuit of FIG. 2 is as follows: The facsimile signal read out by scanning from the original picture to be transmitted is temporarily stored in the input buffer memory 2 through the input terminal 1. The facsimile signal stored in the memory 2 is read out line by line into the shift register 3a for coding. At this time, the information of the scanning line (the reference scanning line) immediately preceding the instant scanning line stored in the shift register 3a is stored in the shift register 3b, and this information is used as reference information when the information of the shift register 3a is coded, and the shift register 3b is at a standstill. The information of the instant scanning line to be coded, stored in the shift register 3a, is shifted by the shift pulses from the shift pulse generator 7 and the picture elements are delivered out one by one to the change detector 4a from the left end of the scanning line. The change detector 4a always checks the information of each picture element as to whether or not it is different from the immediately preceding picture element. The counter 6a indicates how many times the shift register 4a has been shifted, that is, the order number, from the left end of the original picture, of the picture element information just delivered out from the shift register 3a to the change detector 4a. When detecting a change point of the facsimile signal from white to black or from black to white the change detector 4a applies a pulse indicative of the detection of the change point to the shift pulse generator 7 and, at the same time, supplies thereto information of the direction of the change. As a result of this, the shift pulse generator 7 stops the supply of the shift pulses to the shift register 3a to stop its operation. At this time, the run-length counter 5a indicates the number of picture elements counted from the immediately preceding change detection to the instant change detection, in other words, the run length in this time interval.

For the sake of easy explanation, the following description will be given with respect to the example of the facsimile signal of FIG. 1 and on the assumption that the change points to P₀ have already been coded and that the address of the instant change point Q is to be coded. The instant change point Q has been used as the reference information in the coding of the change point P₀. At the completion of coding of the change point P₀, the counter 6a indicates the absolute address (the number of picture elements counted from the left end of the scanning line) of the instant change point Q. On the other hand, the run-length counter 5a indicates the run length $\overline{P_0Q}$. When the change point Q is coded, the shift pulse generator 7 (the operation of which will be described in detail later on) applies shift pulses to the shift register 3a to shift. (Phase I). This shift operation continues until the change detector 4a detects a change point, that is, the change point Q₁, and then stops.

When the operation of the shift register 3a has stopped to detect the change point Q₁ on the instant scanning line to be coded, the next step is to find out a change point on the reference scanning line to check whether or not the instant change point Q is the deviation change point. In case of the deviation change point, its reference change point is determined. (Phase II)

In the shift pulse generator 7, there is stored the previous count value of the counter 6a, that is, the absolute address of the instant change point Q to be coded which immediately precedes the change point Q₁ the absolute address of which is being indicated, and this value is compared with the value of the counter 6b. The counter 6b indicates the order number of the picture element at the output of the shift register 3b from the left end of the original picture, as is the case of the counter 6a. In the shift pulse generator 7, the count value (which is taken as x) of the counter 6b and the previous count value (which is the absolute address of Q₁ in FIG. 1 and is taken as y) of the counter 6a are compared with each other, and if x>y, backward shift pulses (The operation that the picture element at the output of the shift register 3b is successively shifted toward the left end of the original picture is defined as the backward shift, and the normal rightward shift reverse to the above is defined as the forward shift. Pulses for achieving these shifts will hereinafter be referred to as the backward shift pulses and the forward shift pulses, respectively.) are applied to the shift register 3b to cause it to shift in its backward direction. When the shift register 3b has been shifted backwardly to reach the value x=y, the supply of the backward shift pulses is stopped (Phase II is terminated.). If x<y, the shift pulse generator 7 applies the forward shift pulses to the shift register 3b, and when the value x=y has been reached, the supply of the pulses is similarly stopped (Phase II is terminated).

When x=y has thus been provided, the shift pulse generator 7 compares the information of the change point Q (In this example, the information is black and this is known from the output from the change detector 4a) with the information of the picture element at the output of the shift register 3b, (in the example (a) of FIG. 1, black). (i) When the both are identical with each other, the shift pulse generator 7 starts to supply the backward shift pulses to the shift register 3b until the picture element at the output of the shift register 3b becomes the picture element just above the change point P₀, and when a change point has been detected by the change detector 4b, the supply of the pulse is stopped. (ii) When the both are different from each other, the shift pulse generator 7 starts to supply the forward shift pulses to the shift register 3b until the picture element at the output of the shift register 3b becomes the picture element just above the change point Q₁, and when a change point has been detected by the change detector 4b, the supply of the pulses is likewise stopped. (Phase III)

When a change point is detected during the abovesaid shift operation, the instant change point Q to be coded is decided to be the deviation change point, and the operation proceeds to the next phase IV. When no change point is detected, the instant change point Q to be coded is decided not to be the deviation change point, and the shift pulse generator 7 applies a pulse to the gate 9 to open it, through which the run length $\overline{P_0Q}$ stored in the register 8 is applied to the variable-length coding circuit 10 for coding.

The example (d) or (e) in FIG. 1 corresponds to the latter case in which the instant change point to be coded is not the deviation change point, and in this case, the instant change point Q to be coded is decided not to be the deviation change point and the run length $\overline{P_0Q}$ is coded. In the examples (a) and (c) in FIG. 1, the information of the picture element just above the change point Q and the picture element information of the change point Q are both black and hence are the same as each other, so that the shift pulse generator 7 applies the backward shift pulses to the shift register 3b, and when the change detector 4b has detected the change point $P_1$ (in the case (a) in FIG. 1) or $P_2$ (in the case (c) in FIG. 1), the shift pulse generator 7 once stops its operation. Such change point is used as the final reference change point, and an error between the absolute address of the instant change point to be coded and that of the reference change point is calculated by the shift pulse generator 7, and then supplied to the variable-length coding circuit 10. In the example (b) in FIG. 1, the information of the picture element just above the instant change point Q is white and the information of the picture element of the instant change point Q is black, so that the shift pulse generator 7 applies the forward shift pulses to the shift register 3b, and when the change detector 4b has detected the change point $P_1$, the shift pulse generator 7 stops the supply of the forward shift pulses to stop the shift operation of the shift register 3b. At this time, the change point $P_1$ is also used as the final reference change point and information of an error between the absolute address of the abovesaid reference change point and the absolute address of the instant change point Q is sent to the variable-length coding circuit 10 for coding.

The above is the operation of the phase III. In the case of the deviation change point (in such cases (a), (b) and (c) in FIG. 1), the operation proceeds to the next phase IV. The phase IV is to find out where the final reference change point stands in the order of the change points (on the reference scanning line) having the same change direction as the change point Q from the change point $P_0$. The shift pulse generator 7 applies the backward shift pulses to the shift register 3b to shift it backwardly to the picture element just above the change point $P_0$. In this shifting, the change detector 4b detects a change point from the shift register 3b, that is, on the reference scanning line, and the shift pulse generator 7 is supplied with this information and the picture element information of the change points from the shift register 3b to count the number of change points having the same change direction as the change point Q. This count value is the information indicative of which change point ($P_1$, $P_2$, or so on) is the final reference change point, and is also coded in the variable-length coding circuit 10.

In the cases of the examples (a) and (b) in FIG. 1, the change point having the same change direction as the instant change point Q does not exist between the final reference change point and the change point $P_0$. In the case of the example (c) of FIG. 1, there exists one change point $P_1$ of such property. The number of such change points is converted by the variable-length coding circuit 10 into a variable-length code.

Figure 3:
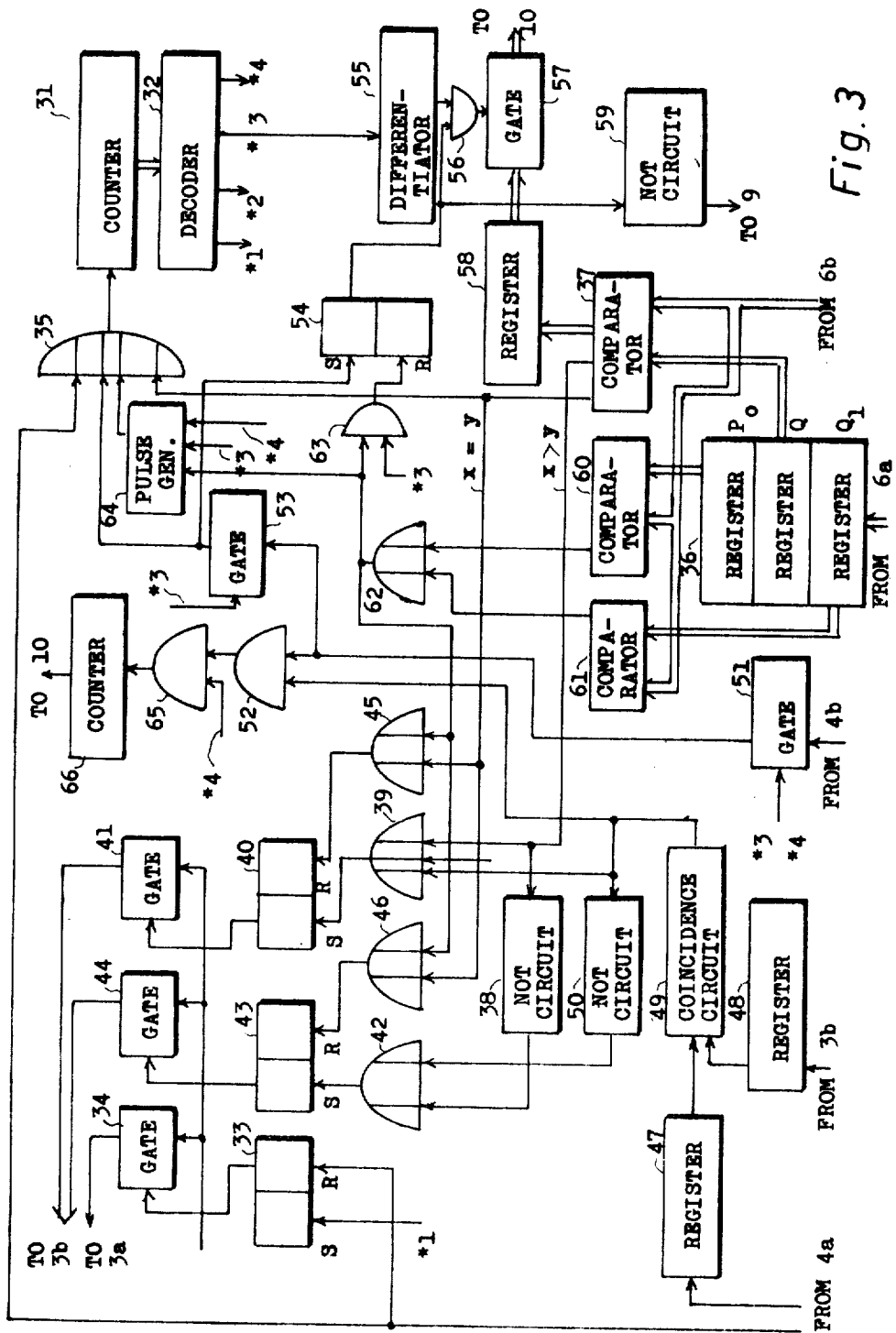
FIG. 3 is a block diagram illustrating an example of a shift pulse generator employed in the embodiment shown in FIG. 2.

FIG. 3 is a diagram showing in detail an example of the concrete construction of the shift pulse generator 7 depicted in the block diagram of FIG. 2. As already described, this is a circuit for generating shift pulses for causing the shift registers 3a and 3b to perform their shift operations, and the operation of this circuit is divided into the following four operation phases:

(I) The shift register 3a is shifted to detect the change point $Q_1$, and then the shift operation is stopped;

(II) The shift register 3b is shifted to obtain the value x=y;

(III) The shift register 3b is shifted in its backward or forward direction to detect a deviation change point; and (IV) In case of detecting a deviation change point, the shift register 3b is further shifted to count the number of change points from the change point $P_0$ to the final reference change point having the same change direction as the instant change point Q to be coded.

In FIG. 3, reference numeral 31 indicates a 2-bit counter indicative of the abovesaid four phases; and 32 designates a decoder whose output *1 is established at the ON-state, for example, in the case of the phase (I). Now, let it be assumed that the phase (IV) has been completed and altered to the phase (I). Then, the output *1 is turned −ON, so that a flip-flop 33 is set to open a gate 34, through which clock pulses are applied to the shift register 3a. This pulses serves as the forward shift pulses for shifting the shift register 3a. When the shift register 3a has shifted and the change detector 4a has detected the change point $Q_1$, the flip-flop 33 is reset to close the gate 34 to stop the supplying of the pulses to the shift register 3a and hence stop its shift operation. At this time, since the pulse from the change detector 4a is applied to the counter 31 through an OR circuit 35, the phase (II) is brought about to turn −OFF the output *1 and turn—ON the output *2. Reference numeral 36 identifies there registers, which respectively store the absolute addresses of the change points $P_0$, Q and $Q_1$. In a comparator 37, the value x of the counter 6b and the intermediate value (y:absolute address of Q) of the register 36 are compared in magnitude with each other. When x=y, the comparator 37 produces a pulse, and since this pulse is applied to the counter 31 through the OR circuit 35, the phase is immediately altered to (III). If x>y, the comparator 37 applies pulses to a NOT circuit 38 and an OR circuit 39. By the output pulse from the latter, a flip-flop 40 is set to open a gate 41, through which clock pulses are applied to the shift register 3b. These are the backward shift pulses. Conversely, if x<y, a flip-flop 43 is set through an OR circuit 42 to open a gate 44, through which clock pulses are also applied to the shift register 3b. These are the forward shift pulses. When the shift register 4 has shifted to reach the value x=y, the comparator 37 applies pulses to OR circuits 45 and 46, so that the supply of the shift pulses to the shift register 3b is stopped and, at the same time, by the pulse through the OR circuit 35, the phase is shifted to (III). When the operation has been changed to the operation phase (III), the output *2 is turned −OFF and the output *3 is turned −ON. Reference numerals 47 and 48 denote registers. The registers 47 and 48 are supplied with one-bit information from the change detector 4a and the shift register 3b, respectively, and store the information (white or black) of the instant change point to be coded and the information (white or black) of the picture element lying at the output of the shift register 3b, i.e. the picture element just above the instant change point to be coded. Reference numeral 49 identifies a coincidence circuit. If the outputs from the registers 47 and 48 are coincident with each other, for instance, in such cases (a), (c) and (e) in FIG. 1, the coincidence circuit 49 generates a pulse, so that the backward shift pulses are applied to the shift register 3b in the same manner as the abovesaid operation. Conversely, if the outputs from the registers 47 and 48 are different from each other (for instance, in such cases (b) and (d) in FIG. 1, the coincidence circuit 49 does not produce any pulse but instead a NOT circuit 50 produces a pulse, by which the flip-flop 43 is reset to open the gate 44, thus spplying the forward shift pulses to the shift register 3b.

In this manner, the shift operation of the shift register 3b starts. Where the instant change point to be coded is the deviation change point as in the cases (a), (b) and (c) in FIG. 1, the change detector 4b detects a change point (which is used as the final reference change point) during shifting of the shift register 3b, and a pulse is applied to the OR circuit 35 through gates 51 and 53, so that the operation of the counter 31 is altered to the phase (IV). At this time, a flip-flop 54 is set, and its output and a pulse indicative of a change of the output *3 from its ON to OFF state, which is obtained in a differentiator 55, are applied to an AND circuit 56. As a result of this, a gate 57 is opened, through which the value stored in a register 58, that is, the value of an error obtained in the comparator 37 between the absolute address of the reference change point (the output value of the counter 6b) and the absolute value of the instant change point Q to be coded (the intermediate value of the register 36) is applied to the vairable-length coding circuit 10 for conversion into a variable-length code. At this time, since the output from a NOT circuit 59 assumes the OFF-state, the gate 9 remains closed.

On the other hand, where the instant change point to be coded is not the deviation change point as in the cases (d) and (e) in FIG. 1, the abovesaid shift operation continues until the picture element just above the change point $P_0$ or $Q_1$ has been delivered out at the output of the shift register 3b, and then stops. The reason is as follows: The absolute address of the picture element at the output of the shift register 3b (the value of the counter 6b) and the absolute addresses of the change points $P_0$ and $Q_1$ are always compared with each other in comparators 60, 61. When its two inputs are coincident with each ther, a pulse is generated from the comparator, and is applied through an OR circuit 62 to the flip-flops 40 and 43 to reset them. Since the output pulse from the OR circuit 62 resets the flip-flop 54 through an AND circuit 63, a pulse is applied through the NOT circuit 59 to the gate 9 to open it. Further, the output pulse from the OR circuit 62 is also applied to a pulse generator 64, and when the phase is III, the pulse generator 64 produces two pulses with one input pulse, so that the phase indicated by the counter 31 skips over (IV) to (I).

The following is the operation of the phase (IV) in the case where the instant change point to be coded is the deviation change point. When the phase has become (IV), the output *4 is truned-ON, so that the output from the OR circuit 39 is turned-ON, and the flip-flop 40 is set to apply the backward shift pulses to the shift register 3b to shift it in its backward direction. This shift operation stops when the picture element just above the change point $P_0$ has just been delivered out at the output of the shift register 3b, as in the case where the instant change point to be coded is not the deviation change point. During this shift operation, an AND circuit 52 receives the output from the change detector 4b and the output from the coincidence circuit 49, so that the AND circuit produces a pulse each time the change point having an information change of the same direction as the instant change point Q to be coded has been obtained at the output of the shift register 3b. Since such pulses are applied to a counter 66 through an AND circuit 65, the counter 66 indicates the number of change points having the same change direction as the instant change point to be coded between the change point $P_0$ to the final reference change point on the reference scanning line, and this information is converted by the variable-length coding circuit 10 into a variable-length code. Thus, the operation for one change point is completed, and then the operations starting from the phase (I) are performed for the next change point.

Figure 4:
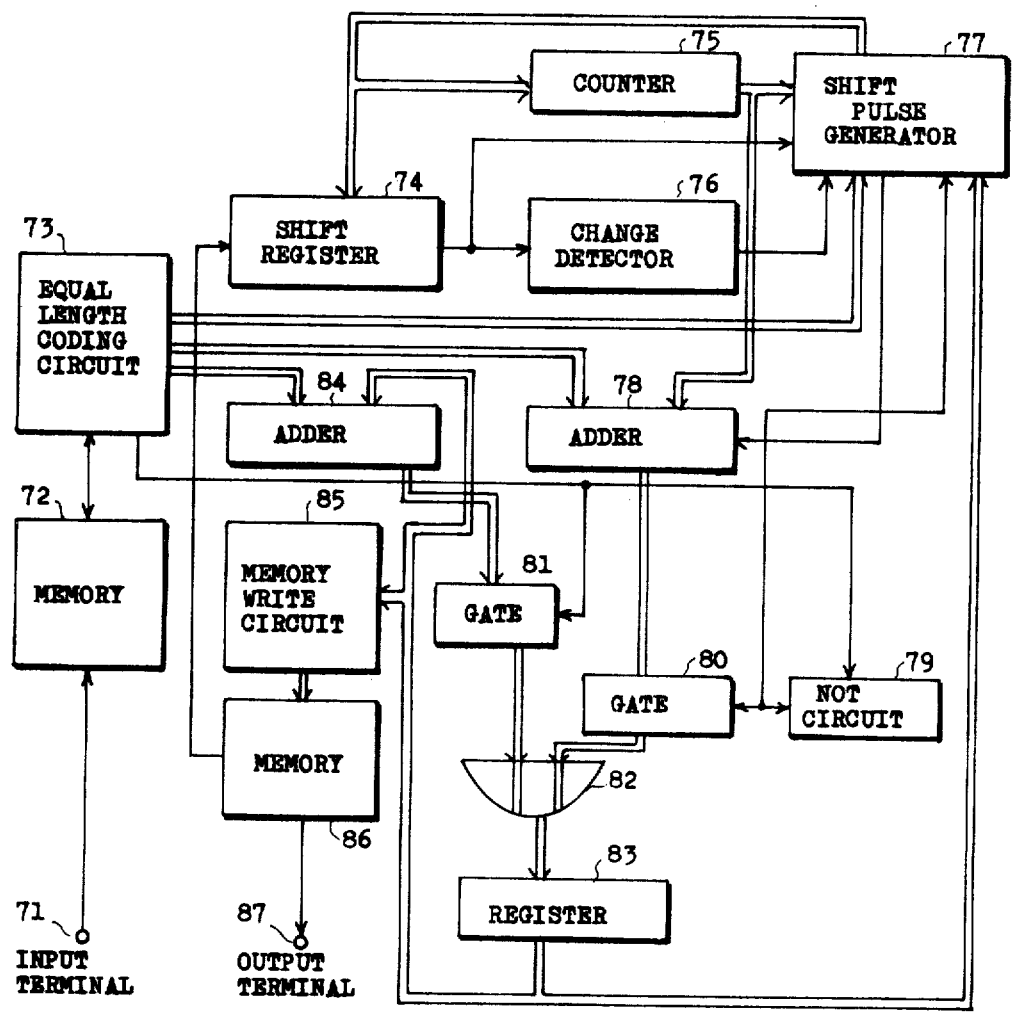
FIG. 4 is a block diagram illustrating an example of the receiving side for receiving a coded facsimile signal produced by the embodiment shown in FIG. 2.

FIG. 4 is a block diagram illustrating an example of the construction of the receiving side for the reception of a facsimile signal produced by the circuit shown FIG. 2. Reference numeral 71 indicates an input terminal for receiving a coded facsimile signal; 72 designates a memory for temporarily storing the facsimile signal applied from the input terminal 71; 73 identifies an equal-length coding circuit by which the facsimile signal converted into the variable-length codes is converted into eequal-length codes. An example of the equal length coding circuit is disclosed in our U.S. Pat. No. 4,040,093 at FIG. 10 thereof. In a case where the instant change point is the deviation change point, the equal-length coding circuit 73 separately provides information indicative of how many change points of the same change direction as the instant change point to be decoded exist between the picture element just above the immediately decoded change point and the final reference change point, and information indicative of the length of deviation of the deviation change point from the reference change point (the information including the direction of the deviation). In a case where the instant change point is not the deviation change point, the equal-length coding circuit 73 separately produces information indicative of the number of picture elements (the run length) from the immediately decoded change point to the instant change point, and information that the instant change point is not the deviation change point (* in FIG. 4). Reference numeral 74 indicates a shift register shiftable in both directions for storing the information of an already -decoded reference scanning line; 75 designates a reversible counter for counting shift pulses to the shift register 74 to indicate the absolute address of the picture element at the output of the shift register 74; 76 identifies a change detector for detecting whether or not the picture element at the output of the shift register 74 has information different from that of the immediately preceding picture element; 77 denotes a shift pulse generator which receives the outputs from the counter 75 and the change detector 76 to generate shift pulses for shifting the shift register 74; 78 represents an adder which adds together the absolute address of the reference change picture element derived from the counter 75 and the length of deviation from the equal-length coding circuit 73 to obtain the absolute address of the instant change point to be decoded; 79 shows a NOT circuit; 80 and 81 refer to gates; 82 indicates an OR circuit; and 83 designates a register for storing the absolute address of the decoded change point. Reference numeral 84 identifies an adder which in the case where the instant change point is not the deviation change point, adds together the information indicative of the number of picture elements (the run length) from the immediately preceding decoded change point to the instant change point to be decoded and the absolute address information of the immediately preceding decoded change point to obtain the absolute address of the instant change point. Reference numeral 85 denotes a memory write circuit which receives the absolute address information of the instant change point to write the facsimile signal in a memory 86 in such a manner that the facsimile signal can be recorded; and 87 represents an output terminal through which the facsimile signal stored in the memory 87 is delivered out to a recording section.

The operation of the circuit shown in the block diagram of FIG. 4 is as follows: The facsimile signal coded to the variable-length codes is applied to the input terminal 71, and is temporarily stored in the memory 72, thereafter being converted by the equal-length coding circuit 73 into equal-length codes. This is a known technique. In a case where the instant change point to be decoded is the deviation change point, the NOT circuit 79 produces a pulse, and the shift pulse generator 77 receives from the equal-length coding circuit 73 the information indicative of how many change points having the information change of the same change direction as the instant change point exist on the reference scanning line between the immediately preceding decoded change point and the final reference change point, and then produces the absolute address of the final reference change point as an output value of the counter 75 in the following manner. Namely, the shift pulse generator 77 receives from the register 83 the absolute address of the immediately preceding decoded change point and shifts the shift register 74 until the picture element obtained at the output of the shift register 74 becomes equal to the abovesaid absolute address. Thereafter, the shift register 74 is shifted in its forward direction to check the picture element obtained at the output of the shift register 74 and the output from the change detector 76 to count the number of the change points having the information change as the same directiion as the coded change point, so that when the count value has become equal to the value obtained from the equal-length coding circuit 73, the shift operation of the shift register 74 is stopped. At this time, the picture element obtained at the output of the shift register 74 is the final reference change point, and its absolute address is indicated by the counter 75.

When the absolute address of the final reference change point has thus been obtained as the output from the counter 75, the adder 78 adds together this value and the value obtained from the equal-length coding circuit 73 (indicating an error between the absolute address of the instant change point and the absolute address of the final reference change point), thereby to obtain the absolute address of the instant change point. This value is temporarily stored in the register 83 through the gate 80 and the OR circuit 82, after which the value is converted into a recordable facsimile signal by the memory write circuit 85, thereafter being written in the memory 86.

In a case where the instant change point to be decoded is not the deviation change point, the instant change point has been coded with its relative length (run length) to the immediately preceding change point. The adder 84 receives the coded distance obtained from the equal-length coding circuit 73 and the absolute address of the immediately preceding decoded change point, and hence produces the absolute address of the instant change point. This information is stored in the register 83 through the gate 81 and the OR circuit 82.

In this manner, each coded change point is decoded. Upon completion of decoding of one scanning line, since the information of this scanning line is employed as reference information in the decoding of the next scanning line, it is written in the shift register 74.

Figure 5:
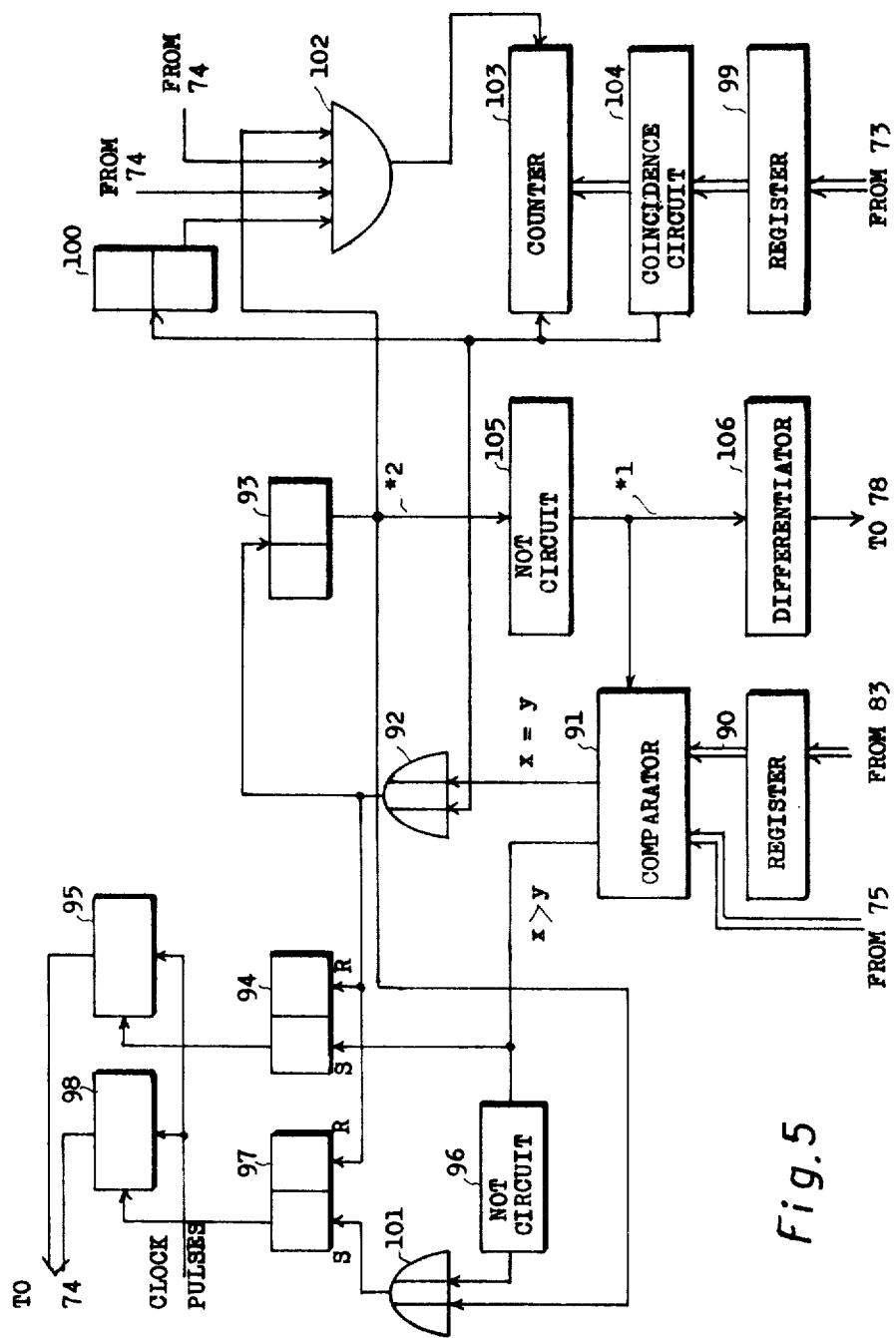
FIG. 5 is a block diagram illustrating an example of a shift pulse generator employed in the example shown in FIG. 4.

FIG. 5 illustrates in detail the shift pulse generator 77 depicted in FIG. 4. Its operation is divided into the following two operation phases:

(I) The shift register 74 is shifted until the picture element just above the immediately preceding decoded change point is delivered out at the output of this shift register 74.

(II) The shift register 74 is shifted until the final reference change point is delivered out at the output of this shift register 74.

The circuit is assumed to start its operation upon reception of a pulse from the NOT circuit 79.

In FIG. 5, reference 90 indicates a register, which has stored therein the value of the register 83, that is, the absolute address (y) of the immediately preceding decoded change point. This value and the value of the counter 75, i.e. the absolute address (x) of the picture element obtained at the output of the shift register 74, are compared with each other in a comparator 91. If $x=y$, the comparator 91 applies a pulse to a T type flip-flop 93 through an OR circuit 92, so that the operation phase immediately shifts to the phase II. When $x>y$, a flip-flop 94 is set to open a gate 95, through which the backward shift pulses are applied to the shift register 74. In a case where $x<y$, a NOT circuit 96 provides a pulse to set a flip-flop 97 through an OR circuit 101 to open a gate 98, through which the forward shift pulses are sent out. In a case where $x \neq y$ as in the above, the shift pulses are applied to the shift register 74, and when the value $x=y$ has reached, its shift operation is stopped to shift the operation phase to the phase II.

When the operation phase has been altered to the phase II, the following operations are carried out. A register 99 has stored therein information indicative of the address of the reference change point derived from the equal-length coding circuit 73 (which information is the information indicative of how many change points having the same change direction as the instant change point exist between the picture element just above the immediately preceding decoded change point and the final reference change point). Reference numeral 100 represents a flip-flop which varies its state at each decoding of one change point, indicating the information of the change point being decoded. When the operation phase has been altered to the phase II, the output *2 is turned-ON, and this information is applied through an OR circuit 101 to the flip-flop 97 to set it, so that the shift register 74 starts to shift in its forward direction. During this shift operation, the change point of the shift register 74 is detected by the change detector 76 and information of the change is obtained from the shift register 74, and consequently an AND circuit 102 generates a pulse each time the picture element obtained at the output of the shift register 74 becomes the change point having the same change direction as the instant change point to be decoded. This pulse is counted by a counter 103, and when the count value of the counter 103 has reached the value stored in the register 99, a coincidence circuit 104 provides a pulse. By this output pulse, the counter 103 is cleared to "0" and the state of the flip-flop 100 is reversed, and by the pulse having passed through the OR circuit 92, the flip-flops 93, 94 and 97 are reset, so that the supply of the shift pulses is stopped and the operation phase is returned to the phase I. At this time, the value indicated by the counter 75 is the absolute value of the final reference change point. Furhter, when the operation phase has been shifted to the phase I, the output from the flip-flop 93 is applied to a NOT circuit 105 to provide an inverted output *1, and at its rise-up time, a differentiator 106 applies a pulse to the adder 78 to effect adding. The above is the operation of the shift pulse generator 77.

In the method described above, in the case of the deviation change point, the final reference change point is not always $P_1$ but may also be $P_2$ or $P_i$ ($i>2$). To simplify the above, it is also possible, of course, to employ such a method that in the case of the deviation change point, the reference change point is fixed, for instance, to the point $P_1$. This permits of simplification of the circuit used, and does not require the address information of the reference change point as the information to be sent. But since the distance from the final reference change point to the instant change point to be coded does not always become the length of deviation, its value usually becomes large and the number of bits also increases. With the combination of such merit and demerit, the sum total of output bits usually increases though dependent upon the property of the original picture to be transmitted.

Further simplification is also possible. That is, the address of the instant change point to be coded can be coded with the distance from a constantly fixed change point, for example, $P_1$, $P_2$ or $P_3$ regardless of whether or not the instant change point to be coded is the deviation change point, but in this case, the number of output bits further increases.

As has been described above in detail, in the method of the present invention, change points are checked as to whether each is the deviation change point or not, and in the case of the deviation change point, the length of deviation from the address of the reference change point is coded, and in the case of the non-deviation change point, the length from the immediately preceding change point is coded. This implies that coding is achieved in accordance with the property of each change point. Therefore, the number of bits necessary for coding is small, and consequently the transmission time can be remarkedly shortened.

What we claim is:

1. A method for coding addresses of information change picture elements each having information different from that of the immediately preceding picture element in a facsimile signal obtained by successively scanning an original picture, comprising steps of:
    classifying said information change picture elements into deviation change points each having a high correlation to a final reference change point selected from coded information picture elements, and new change points each having substantially no correlation to the reference change point, said deviation change point being defined as a change point to be coded starting a run of one information type in an instant scanning line and having in an immediately preceding scanning line a run of the same information type overlying the run started by the deviation change point but which does not overlie a preceding run of the same information type in the instant scanning line;
    receiving each of said deviation change points and coding the address of its final reference change point and the direction and length of each deviation of said deviation change points from the corresponding final reference change point; and
    receiving said new change points and coding each distance to new change point from the immediately preceding information change picture element wherein said deviation change points and the reference change point thereof are determined by
    first, searching a change point next to the instant change point to be coded on the instant scanning line to be coded;
    secondly, checking whether or not the information of the picture element just above the instant change point to be coded is the same as the information of the instant change point and skipping to the following seventh step when the former has information different from that of the latter;
    thirdly, searching a change point in a direction opposite to the scanning direction on a reference scanning line immediately preceding the instant scanning line from a picture element just above the instant change point to a picture element just above a change point immediately preceding the instant picture element;
    fourthly, determining that the instant change point is not the deviation change point when no change point is found at the third step of searching;
    fifthly, determining that the instant change point is the deviation change point when a change point is found at the third step of searching and then employing the found change point as the final reference change point;
    sixthly, checking further in the left direction from the final reference change point to a picture element just above a change point immediately preceding the instant change point to count the number of change points of the same change direction as the instant change point so as to obtain the address of the final reference change point;
    seventhly, searching a change point on the reference scanning line in the scanning direction from a picture element just above the instant change point to a picture element just above a change point immediately succeeding the instant change point;
    eightly, determining that the instant change point is not the deviation change point when no change point is found at the seventh step of searching;
    ninethly, determining that the instant change point is the deviation change point when a change point is found at the seventh step of searching and then employing the found change point as the final reference change point; and
    tenthly, skipping to the sixth step.

2. A method according to claim 1, in which said deviation change points are defined as an instant change point to be coded such that a run of the same information overlying on an instant run starting from the instant change point is included in the immediately preceding scanning line but does not overlie on a run of the same information immediately preceding an instant run including the instant change point.

* * * * *